United States Patent [19]

Wesala

[11] Patent Number: 4,473,403

[45] Date of Patent: Sep. 25, 1984

[54] MOLD RELEASE AGENTS FOR OPEN-CELL MOLDED FOAMED ARTICLES AND MEANS OF APPLICATION

[75] Inventor: Robert J. Wesala, Dearborn, Mich.

[73] Assignee: Park Chemical Company, Detroit, Mich.

[21] Appl. No.: 580,205

[22] Filed: Feb. 15, 1984

[51] Int. Cl.³ .............................................. B28B 7/36
[52] U.S. Cl. ................................ 106/38.24; 106/243; 427/133; 427/135
[58] Field of Search .......................... 106/38.24, 243; 427/133, 135

[56] References Cited

U.S. PATENT DOCUMENTS 4,038,088  7/1977  White et al. ...................... 106/38.24
4,110,119  8/1978  Boehmke et al. ................ 106/38.24

Primary Examiner—Lorenzo B. Hayes
Attorney, Agent, or Firm—Krass & Young

[57] ABSTRACT

Water based mold release agents and means for their application are provided. The release agents are used in coating molds for forming high resilience (HR) open-cell foamed plastics especially those known as HR seating foams. The release agents which contain lithium soap and polyol ester, give excellent performance with respect to ease of release, prevention of residual build-up, and mold and part cleanability. A key feature is that the release agents uniquely provide an open-cell foam surface in the resulting molded articles so that the same have high resilience.

8 Claims, No Drawings

MOLD RELEASE AGENTS FOR OPEN-CELL MOLDED FOAMED ARTICLES AND MEANS OF APPLICATION

DESCRIPTION

TECHNICAL FIELD

This invention relates to mold release agents and means for their application. More particularly, the invention relates to release agents used in coating molds for forming plastics into open-cell foamed articles, especially in connection with molding of expandible polyurethane plastics, and more especially high resilience (HR) formed plastics.

BACKGROUND ART

Mold release agents, as reported in "The Mold Release Quandary", *Plastics Technology*, pages 65–70 September, 1980, must form a film or vapor interlayer on the mold tool surface. This layer should be inert to the molding material and not attack the tool surface. At the end of each molding cycle, the release agent should also enable an easy release of the molded part such that the part has no surface attack or visible surface defect, in other words, a "Class A Surface". When used for the release of HR foamed plastics where the surface of the molded parts has open cells and closed cells, the mold release agent employed should leave the open cells free; that is, should not block the opens cells since this would adversely affect or lower the desired high resilience of the molded foam part. A release agent generally contains a blend of several ingredients including active ingredients which cause the release action, a solvent, a film-former, a drying or curing agent, and added lubricant to enhance releasability. Ingredients can range from greases, natural waxes, soaps, emulsions, mineral oils, fats, lecithins, metal stearates, silicones, fluorocarbons, synthetic waxes, organophosphates, polyaliphatic alcohols and polymeric resins. There are several key criteria (other than those mentioned) for selecting a particular mold release agent such as ability to clean the release agent from the mold, compatibility of the release agent (if carried away on the part surface or if allowed to build-up on the mold surface), health and safety risks of exposure to flammable or toxic ingredients of the release agent, and relative cost both of the release agent and its use. Ideally, the release agent when coated as a layer onto the tool surface should not be too soft so that it is removed or "scrubbed" each time the resin is injected into the mold. In other words, it should be sufficiently hard that it remains intact (i.e., does not flake-off or transfer to the part) as a suitable release layer for a number of injection and release cycles, without requiring replacement. Also, the release layer once established should remain sufficiently protective that the resin or foam does not "strike through" and build-up unreleasably on the tool surface. Further, it should not retain water. For example, in the case of isocyanate-reacting foams, water causes the formation of polyurea which is an undesirable part surface contaminant that causes problems with later steps of processing the part. It has been proposed to use a high molecular weight saturated or unsaturated fatty acid soap such as the oleate or the isostearate as a release agent for molding. The difficulty with use of an oleate or isostearate release agent, however, is that each is associated with part surface attack, water retention, polyurea build-up and/or foam build-up. Also, while the higher fatty acid soaps such as sodium soaps or potassium soaps may be satisfactory as a release agent where the molded part surface is a closed-cell foam surface, they are not satisfactory for applications in high resiliciency foams where the surface of the molded part is required to be an open-cell surface so that there is as little restriction of gas flow through its structure as possible during deformation and stress recovery (cf. Advances in Urethane Science and Technology, Vol. 3, 108, Technomic Publishing, Inc., Westport, Conn., 1973).

It is therefore an object of the present invention to provide novel mold release agents and means of application which agents are applied as a durable yet readily cleanable protective release layer or coating on mold surfaces for purposes of plastic molding.

It is also an object of the invention to provide mold release agents for polyurethane molding which, in coated form for the molding and release of parts, perform efficiently without substantial scrubbing, flaking, part surface attack, water retention, polyurea build-up, strike-through or foam build-up.

It is a further object to provide mold release agents and means for their application which do not involve use of an objectionable organic solvent in an industrial environment.

It is still another object to provide mold release agents which are economical, provide an open-cell surface on the molded parts, and are disposable at low cost by ordinary waste disposal methods.

These and other objects, features and advantages will be seen from the following detailed description of the invention.

SUMMARY AND DETAILED DESCRIPTION

The invention in one aspect concerns a mold release agent for coating molds and mold tool surfaces for forming high resilience open-cell foamed plastics. The mold release agent is a solid-free aqueous formulation at a hydrogen ion concentration in the range from about pH 8.5 to about pH 11, consisting essentially of about 4% by weight lithium fatty acid soap expressed as free acid consisting essentially of from about 0.5 to about 2.0 parts by weight $C_{18}$ unsaturated fatty acid and about 3.5 to about 2.0 parts pelargonic acid, about 1.5 to about 6% by weight polyol ester selected from ethylene glycol monopelargonate and glyceryl monopelargonate, and the balance water. The term $C_{18}$ unsaturated fatty acid as used herein, refers to $C_{18}$ mono-unsaturated fatty acid, namely oleic acid, linoleic acid, and mixtures thereof, which for purposes of the invention are in fully saponified lithium soap form. The formulation may be in ready-to-use form or may be in concentrated form dilutable with water, with pH adjustment if necessary, to provide any desired ready-to-use dilution. Mold release agents containing lithium soap and polyol pelargonate ester according to the invention, uniquely fulfill the many exacting requirements not met by prior agents. Thus, while mold release agents based on sodium or potassium saponified higher fatty acid may fall short with respect to characteristics such as ease of release and provision of open-cell surface in the molded part, agents which contain monopelargonate ester, it is found, surprisingly perform these and other desired functions with great efficiency. The combination of components thus achieves functions that the single components do not achieve, namely, good release performance, provision of a breathable, open-cell surface of the molded part, and reduced build-up contamination of polyurea and foam. In the description which follows, the invention will be described with particular emphasis on polyurethane technology. However, it will be realized that the invention broadly applies to foamed plastics molding generally.

For formulation purposes, the compositions of the invention can be made up in any suitable way. For example, the free acid is reacted at ambient temperature in dilute aqueous lithium hydroxide solution, to form the lithium soap. The invention also contemplates using preformed soap. Sufficient hydroxide is employed to neutralize the free acid and maintain the pH of the finished formulation in the approximate range from pH 8.5 to pH 11 and preferably at about pH 9.3. A preferred mold release agent is one constituted at pH 9.3 with lithium soap obtained by reacting lithium hydroxide in water containing pelargonic acid, preferably about 2.5 parts by weight, and oleic acid or linoleic acid, preferably about 1.5 parts by weight. The polyol ester component preferably is ethylene glycol monopelargonate, glyceryl monopelargonate, or a mixture of both, preferably in the amount of about 2% by weight of the formulation. If desired, the formulations of the invention may include compatible excipients such as deodorizer, stabilizer, etc., which meet the objectives of the invention.

The invention in another aspect concerns a method of forming molded parts comprising the steps of applying a uniform dried coating of the release agent onto the mold surfaces of a mold, forming a high resilience open-cell foamed molded article in the thus coated mold at a mold temperature sufficiently high, preferably in the range from about 130° to about 170° and more preferably about 140° F. or higher, to enable release of the molded part from the mold without sticking, and removing the molded part from the mold. Advantageously, the method avoids the use of hazardous, expensive solvents. The film coat can be applied in any suitable way such as spraying (air, airless, electrostatic or aerosol) brushing, wiping or rolling. In a preferred case, using a Binks 62 spray gun at 12 inch distance, the release agent is sprayed for five seconds nearly perpendicular to each vertical surface and bottom surface of the mold preheated to about 120° to about 150° F. Normal conditions are 30 psi, liquid flow ⅜ turn, air flow 1½ turns. Two applications are made fo the first part and one application before each additional part. For drying, the coated mold is reheated to about 150° F. for ten minutes. The total molding cycle time is about 10 to about 15 minutes.

The invention is illustrated, and the best mode of practicing the invention is described, by the following examples of preferred molding and mold release operations.

EXAMPLE 1

| Component | Percent by Weight |
|---|---|
| Pelargonic acid | 2.5 |
| Oleic acid | 1.5 |
| Lithium hydroxide (LiOH.H$_2$O) | 0.9 |
| Ethylene Glycol mono Pelargonate | 2.0 |
| Water | 94.14 |

A container is charged with the water at room temperature. The lithium hydroxide is carefully added with agitation until dissolved. The pelargonic and oleic acid are then slowly added with thorough mixing. When addition is complete, the pH is adjusted to pH 9.3, if necessary. The ethylene glycol monopelargonate is added, and the resulting solution is filtered through a fine mesh screen to remove solids. The solid-free solution is a ready-to-use formulation. When sprayed onto mold surfaces as described above, it serves as a useful mold release agent for polyurethane HR systems. One such preferred polyurethane system designed for high-resilience seating foam molding applications (furniture, auto seats, etc.) uses resin No. WCV 23400-R available from Wyandotte Chemicals, Wyandotte, Mich., and isocyanate No. T-422 available from Mobay Chemical, Pittsburgh, Pa. The system uses a 12.6:5 resin/isocyanate weight ratio at ambient material temperature and mold temperature ranging from about 140° to about 150° F.

Concentrate formulations, dilutable with water at the site of use, are made in the same way as the above exemplified read-to-use formulation using, however, less water. For example, one may use from about ¼ to ½ the amount of water for this purpose.

EXAMPLE 2

Another preferred mold release agent is prepared by the procedure of Example 1 but uses a different polyol ester component as follows:

| Component | Percent by weight |
|---|---|
| Pelargonic acid | 2.0 |
| Oleic acid | 2.5 |
| Glyceryl mono-Pelargonate | 1.5 |
| LiOH.H$_2$O | 0.9 |
| Water | 93.1 |

Another preferred mold release agent uses the same formulation except that linoleic acid is substituted for the oleic acid in equal amount.

In a molding and mold release performance comparison using the resin/isocyanate system of Example 1 in a standard test mold and further using a mold temperature of 150° F., the following typical release characteristics were noted.

| Test Characteristics | HR Mold Release 1 | 2 |
|---|---|---|
| Release force (ozs.) | 20 | 29 |
| Part Surface | fine open cells | fine open cells |
| Polyurea build-up % | 0.5 | 0.5 |
| Foam, % | 9.8 | 1.2 |

These results show that the release agents of the invention provided HR molded parts with a surface containing fine open cells (as opposed to closed cells). The polyurea and foam were relatively low and both were acceptable for industrial purposes.

The results also show that a mold temperature of 150° F. is sufficiently high, under the exemplified conditions, to enable relative ease in mold release, given the fact that production is considered difficult, it is found, whenever the release force is higher than about 35 oz.

The embodiments of the invention in which an exclusive property or privilege is claimed are defined as follows:

1. A mold release agent for coating molds for forming high resilience open-cell foamed plastics, constituted as a solid-free aqueous formulation at a hydrogen ion concentration in the range from about pH 8.5 to about pH 11, consisting essentially of about 4% by weight lithium fatty acid soap expressed as free acid consisting essentially of from about 0.5 to about 2.0 parts $C_{18}$ unsaturated fatty acid and about 3.5 to about 2.0 parts pelargonic acid, about 1.5 to about 6% by weight polyol ester selected from ethylene glycol monopelargonate and glyceryl monopelargonate, and the balance water.

2. A mold release agent according to claim 1 where the unsaturated fatty acid comprises oleic acid.

3. A mold release agent according to claim 1 where the unsaturated fatty acid comprises linoleic acid.

4. A mold release agent according to claim 1 where the lithium soap expressed as free acid contains about 1.5 parts oleic acid and about 2.5 parts pelargonic acid.

5. A mold release agent according to claim 1 where the pH is about 9.3.

6. A mold release agent according to claim 1 where the polyol ester comprises ethylene glycol monopelargonate.

7. A mold release agent according to claim 1 where the polyol ester comprises glyceryl monopelargonate.

8. A mold release agent according to claim 1 containing lithium soap obtained by completely neutralizing the unsaturated acid and the pelargonic acid with lithium hydroxide.

* * * * *